(12) United States Patent
Mun et al.

(10) Patent No.: US 9,631,067 B2
(45) Date of Patent: Apr. 25, 2017

(54) CARBON FIBER COMPOSITE COATED WITH SILICON CARBIDE AND PRODUCTION METHOD FOR SAME

(75) Inventors: So Youn Mun, Gyeonggi-do (KR); Dong Jin Lee, Seoul (KR); Hyung Mi Lim, Gyeonggi-do (KR); Kwang Yeon Cho, Seoul (KR)

(73) Assignee: Korea Institute of Ceramic Engineering and Technology, Seoul (KR)

( * ) Notice: Subject to any disclaimer, the term of this patent is extended or adjusted under 35 U.S.C. 154(b) by 111 days.

(21) Appl. No.: 14/422,719

(22) PCT Filed: Aug. 22, 2012

(86) PCT No.: PCT/KR2012/006683
§ 371 (c)(1),
(2), (4) Date: Feb. 20, 2015

(87) PCT Pub. No.: WO2014/030782
PCT Pub. Date: Feb. 27, 2014

(65) Prior Publication Data
US 2015/0232647 A1  Aug. 20, 2015

(30) Foreign Application Priority Data

Aug. 22, 2012  (KR) .................. 10-2012-0091716

(51) Int. Cl.
| | | |
|---|---|---|
| B32B 27/20 | (2006.01) |
| B32B 27/36 | (2006.01) |
| B32B 27/38 | (2006.01) |
| B32B 27/40 | (2006.01) |
| B32B 27/42 | (2006.01) |
| B05D 3/02 | (2006.01) |
| C08K 9/06 | (2006.01) |
| C08K 9/02 | (2006.01) |
| B05D 3/12 | (2006.01) |
| D06M 11/74 | (2006.01) |
| D06M 11/77 | (2006.01) |
| C08L 61/04 | (2006.01) |
| C08L 63/00 | (2006.01) |
| C08L 67/08 | (2006.01) |
| C08L 75/04 | (2006.01) |
| D06M 101/40 | (2006.01) |

(52) U.S. Cl.
CPC .............. C08K 9/02 (2013.01); B05D 3/0272 (2013.01); B05D 3/12 (2013.01); D06M 11/74 (2013.01); D06M 11/77 (2013.01); *D06M 2101/40* (2013.01); *D06M 2200/30* (2013.01); *Y10T 428/292* (2015.01)

(58) Field of Classification Search
None
See application file for complete search history.

(56) References Cited

U.S. PATENT DOCUMENTS 5,000,247 A * 3/1991 Burke ................. C04B 41/009
164/101

FOREIGN PATENT DOCUMENTS

| | | |
|---|---|---|
| JP | 1994313268 | 11/1994 |
| JP | 2007107151 | 4/2007 |
| JP | 2010242091 | 10/2010 |
| KR | 100558073 | 2/2006 |
| KR | 10-2011-0080729 A * | 7/2011 ............. C23C 28/00 |

OTHER PUBLICATIONS

Machine translation of KR 10-2011-0080729 A (no date).*
Machine translation of JP 2007-107151 A (no date).*
Machine translation of JP 06-313268 A (no date).*

* cited by examiner

*Primary Examiner* — Michael J Feely
(74) *Attorney, Agent, or Firm* — Hammer & Associates, P.C.

(57) ABSTRACT

A carbon fiber composite including: carbon fiber; and silicon carbide coated on the surface of the carbon fiber, and a production method of the same are provided. The carbon fiber composite may reduce weight, implement an outstanding heat-dissipating efficiency by using high thermal conductivity, and be used in various ways in electronic products and the like where heat-dissipating characteristics are required.

10 Claims, 6 Drawing Sheets

CARBON FIBER COMPOSITE COATED WITH SILICON CARBIDE AND PRODUCTION METHOD FOR SAME

CROSS-REFERENCE TO RELATED APPLICATIONS

This application claims priority under 35 USC §119(a) of Korean Patent Applications No. 10-2012-0091716 filed on Aug. 22, 2012, the subject matters of which are hereby incorporated by references.

BACKGROUND

Field of the Invention

The present invention relates to a carbon fiber composite coated with silicon carbide and a production method of the same.

Background Art

In general, metal is most often used as a material for the main bodies, chassis, or heat sinks of most electronic devices including a heat generating material. The reason is because of high thermal conductivity which the metal has.

As compared to other materials, metal has characteristics of rapidly diffusing absorbed heat to the surroundings, and when the characteristics are used, heat-sensitive electronic components may be prevented from being kept in a local high-temperature state. Furthermore, since metal has both high mechanical strength and processability such as sheet metal or metal mold, and cutting, it is appropriate to use metal as a material for heat dissipation, which requires processing into a complicated shape.

However, since metal has a relatively high density, the high density becomes a barrier for making products lighter, and is responsible for increasing the production costs.

SUMMARY OF THE INVENTION

Technical Problem

The present invention has been made in an effort to provide a carbon fiber composite which may implement high thermal conductivity without degrading mechanical properties, and a production method for the same.

Technical Solution

The present invention provides a carbon fiber composite including: carbon fiber; and silicon carbide coated onto the surface of the carbon fiber, and an electronic product using the same as a heat-dissipating material.

Further, the present invention provides a method for producing a carbon fiber composite, the method including: coating a carbon fiber by using a silica sol; subjecting the carbon fiber coated with the silica sol to a primary heat treatment at 900° C. to 1,200° C.; and subjecting the primarily heat-treated carbon fiber to a secondary heat treatment at 1,300° C. to 1,600° C.

Effect of the Invention

The carbon fiber composite according to the present invention is formed of carbon fiber, and thus may reduce weight and implement an outstanding heat-dissipating efficiency by using high thermal conductivity.

DETAILED DESCRIPTION OF THE INVENTION

The present invention relates to a carbon fiber composite including: carbon fiber; and silicon carbide coated onto the surface of the carbon fiber.

The amount of silicon carbide coated onto the surface of the carbon fiber may be 5 to 30 parts by weight, 5 to 15 parts by weight, 10 to 25 parts by weight, or 15 to 25 parts by weight, based on the total 100 parts by weight of the carbon fiber composite. By adjusting the amount of silicon carbide to be coated to the range, silicon carbide is uniformly applied to the surface of the carbon fiber, and simultaneously, intrinsic physical properties which the carbon fiber has are not degraded. When the amount of silicon carbide to be coated is increased more than the range, there may occur a problem in that elasticity of the carbon fiber composite deteriorates, and the carbon fiber composite easily breaks.

In the carbon fiber composite, the coating layer of silicon carbide coated onto the surface of the carbon fiber may have a thickness in a range of about 100 to 500 nm, 200 to 450 nm, 150 to 300 nm, or 250 to 350 nm. As the amount of silicon carbide is increased, the thickness of the coating layer to be formed may vary.

Figure 6:
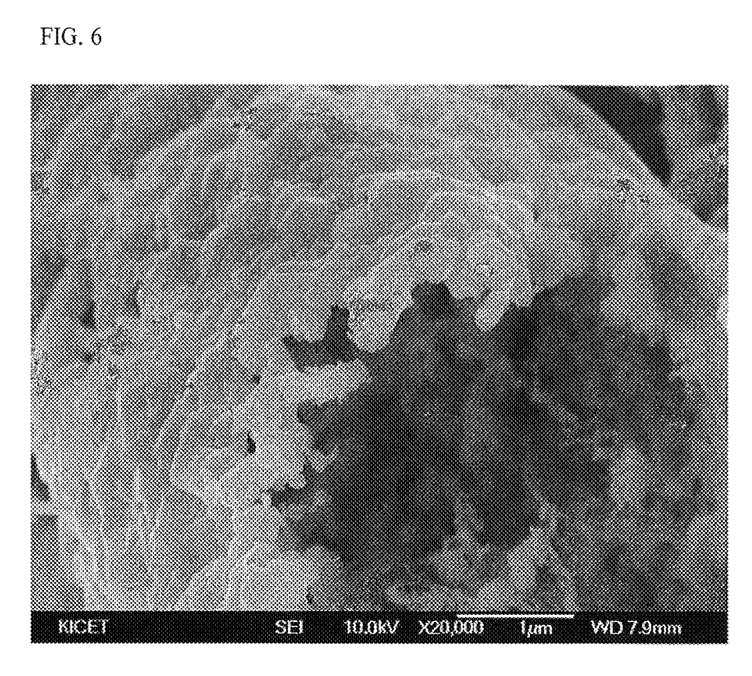
FIG. 6 is a result in which a thermogravimetric analysis (TGA) is performed on a carbon fiber which is coated with silicon carbide (Example 1), and then the remaining silicon carbide coating layer is observed by a scanning electron microscope.

Further, in the carbon fiber composite according to the present invention, the silicon carbide coated onto the surface of the carbon fiber shows relatively high coverage and uniform degree of dispersion. As an example, the coverage of the silicon carbide to be coated onto the carbon fiber may be 90% or more as compared to the surface area of the carbon fiber. The coverage of the silicon carbide may be, for example, 90% or more, 90 to 99.9%, 95 to 95%, 90 to 95%, or 95 to 99.9%. The coverage is a result in which the value of the area, onto which the silicon carbide is coated, is converted into a percentage as compared to the surface area of the carbon fiber. In addition, as illustrated in FIG. 6, the silicon carbide coated onto the carbon fiber shows a very uniform particle distribution.

These high coverage and excellent degree of dispersion serve to implement a wholly uniform thermal conductivity of the carbon fiber composite and prevent heat from being concentrated on a specific site. Furthermore, these high coverage and excellent degree of dispersion have an effect of further enhancing and making the mechanical strength of the carbon fiber composite uniform. These high coverage and uniform degree of dispersion may be implemented by coating a silica sol onto a carbon fiber, and then using a carbothermal reduction method, and are significantly high values as compared to a value of the case in which the coating is performed by a simple spray method.

The carbon fiber composite according to the present invention may further include a binder resin. The kind of binder resin is not particularly limited. As the binder resin, it is possible to use a thermosetting resin, a photocurable resin, a thermoplastic resin, a silane compound which is hydrolyzed to cause a condensation reaction, and the like. As an example of the thermosetting resin, it is possible to use one or more of an epoxy resin, a polyurethane resin, a phenol resin, and an alkyd resin. The carbon fiber composite according to the present invention includes not only a composition form including the binder resin, but also a state in which the carbon fiber composite is cured by irradiating heat or light thereon.

The content of binder resin may be applied in various ways according to the use purpose. For example, the content of the carbon fiber composite including the binder resin may be 10 to 95 parts by weight based on the total 100 parts by weight. In the present invention, thermal conductivity was measured by varying the blending ratio of the carbon fiber coated with silicon carbide and the binder resin, and as a result, it was confirmed that as the content of the carbon fiber coated with silicon carbide was increased, thermal conductivity was enhanced.

In an exemplary embodiment, it was shown that a curing test sample of a carbon fiber composite having a content of the binder resin of 40 to 80 parts by weight based on the total 100 parts by weight of the carbon fiber composite including the binder resin had a thermal conductivity in a range of 3.8 W/mK or more, 3.8 to 8 W/mK, or 3.94 to 7.50 W/mK when measured at 450 V and room temperature.

The present invention also provides a method for producing the carbon fiber composite previously described.

As an example, the method for producing a carbon fiber composite includes:
  coating a carbon fiber by using a silica sol;
  subjecting the carbon fiber coated with the silica sol to a primary heat treatment at 900° C. to 1,200° C.; and
  subjecting the primarily heat-treated carbon fiber to a secondary heat treatment at 1,300° C. to 1,600° C.

The production method of the present invention may be subjected to a pretreatment step of removing a sizing agent remaining on the surface of the carbon fiber before the coating of the carbon fiber by using the silica sol. The pretreatment step of removing the sizing agent is not particularly limited, and may be performed by a heat treatment method under an argon atmosphere at 850° C. to 1,100° C. for 10 to 20 hours.

As the coating of the carbon fiber by using the silica sol, various coating methods may be applied without limitation. As an example, it is possible to use dip coating, spin coating, screen coating, offset printing, ink jet printing, a spray method, pad printing, knife coating, kiss coating, gravure coating, brushing, ultrasonic fine spray coating, spray-mist spray coating, and the like. For example, the coating of the carbon fiber by using the silica sol may be performed by using dip coating.

The present invention includes subjecting the carbon fiber coated with the silica sol to a primary heat treatment at 900° C. to 1,200° C., and subjecting the carbon fiber to a secondary heat treatment at 1,300° C. to 1,600° C.

The primary heat treatment step serves to allow oxides of silica particles attached to the surface of the carbon fiber to aggregate. The primary heat treatment step may be performed under a heat treatment condition such as, for example, a temperature of 900° C. to 1,200° C., 950° C. to 1,100° C., or 1,000° C. for 30 minutes to 3 hours, or 50 minutes to 2 hours.

The secondary heat treatment step serves to convert oxides of silica particles attached to the surface of the carbon fiber into silicon carbide. For example, through the secondary heat treatment, $SiO_2$ attached to the surface of the carbon fiber is converted into SiC. The secondary heat treatment step may be performed under a heat treatment condition such as, for example, a temperature of 1,300° C. to 1,600° C., 1,400° C. to 1,500° C., or 1,450° C. for 30 minutes to 3 hours, or 50 minutes to 2 hours.

After the secondary heat treatment step, the method may be subjected to mixing the secondarily heat-treated carbon fiber with a binder resin, and performing an ultrasonic wave treatment on the mixture. Through the ultrasonic wave treatment, the secondarily heat-treated carbon fiber is dispersed on the binder resin. Thereafter, the carbon fiber may be additionally subjected to a drying and high temperature compression process, and the like. The high temperature compression process may be performed at a temperature of, for example, 90° C. to 130° C. for 30 minutes to 2 hours.

Further, the present invention provides a heat insulating material using the carbon fiber composite previously described. The heat insulating material may be manufactured in various forms of products, and may be applied to an electronic product, and the like. For example, the heat insulating material may be applied to various fields such as the electronic products including a personal computer (PC), a mobile phone, a display device, telecommunication equipment, an engine, a motor, a battery, an LED lamp, a heater, and a housing material, and may be applied even to a home appliance product in various forms.

EXAMPLES

Hereinafter, the present invention will be described in more detail through Examples and the like. The Examples and the like of the present invention are provided only for the detailed description of the invention, and the scope of the rights is not limited thereby.

Example 1

Production of Carbon Fiber Composite Coated with Silicon Carbide

Before a carbon fiber was coated, a pretreatment was performed under an argon atmosphere at 950° C. for 15 hours in order to remove a sizing agent. The carbon fiber was maintained in a state as tight as possible in a silica sol having a content of 30 wt %, subjected to dip coating at a predetermined rate, and dried at room temperature for 1 hour to attach silica particles to the surface of the carbon fiber. The carbon fiber to which silica particle are attached was subjected to heat treatment under an argon atmosphere at 1,000°

C. for 1 hour for the aggregation of the oxide layer. And then, a carbon fiber (SiC/CF) uniformly coated with SiC was produced by performing the heat treatment at 1,450° C. for 1 hour again.

Example 2

Production of Carbon Fiber Composite Including Binder Resin

An epoxy resin was selected as a polymer for binding the SiC/CF produced in Example 1. The epoxy resin and acetone were mixed at a ratio of 1:1 to prepare a resin solution, the SiC/CF was mixed with the resin solution, and the mixture was ultrasonically treated for about 1 hour. And then, a carbon fiber composite including a polymer resin was produced by drying the mixture using an oven, and compressing the mixture at 110° C. for approximately 1 hour using a hot press.

Comparative Example 1

Production of Carbon Fiber Composite without being Subjected to Coating Treatment A carbon fiber from which the sizing agent had been removed was subjected to the same heat treatment procedure as in Example 1, and then a carbon fiber composite was produced by using an epoxy resin as the binder resin in the same manner as in Example 2.

Comparative Example 2

Production of Carbon Fiber Composite Using Spray Method

A carbon fiber from which the sizing agent had been removed was coated with a silica sol by using a spray method, and then a SiC/CF composite was produced by subjecting the carbon fiber to the same heat treatment procedure as in Example 1.

Comparative Example 3

Production of Carbon Fiber Composite Using Spray Method

A carbon fiber from which the sizing agent had been removed was coated with a silica sol by using a spray method, and then a SiC/CF composite was produced by subjecting the carbon fiber to the same heat treatment procedure as in Example 1.

And then, a carbon fiber composite was produced by using an epoxy resin as the binder resin in the same manner as in Example 2.

Experimental Example 1

Observation of Carbon Fiber Composite Using Scanning Electron Microscope

The carbon fiber composites produced in Example 1 and Comparative Example 2 were each photographed by a scanning electron microscope (SEM).

Figure 1:
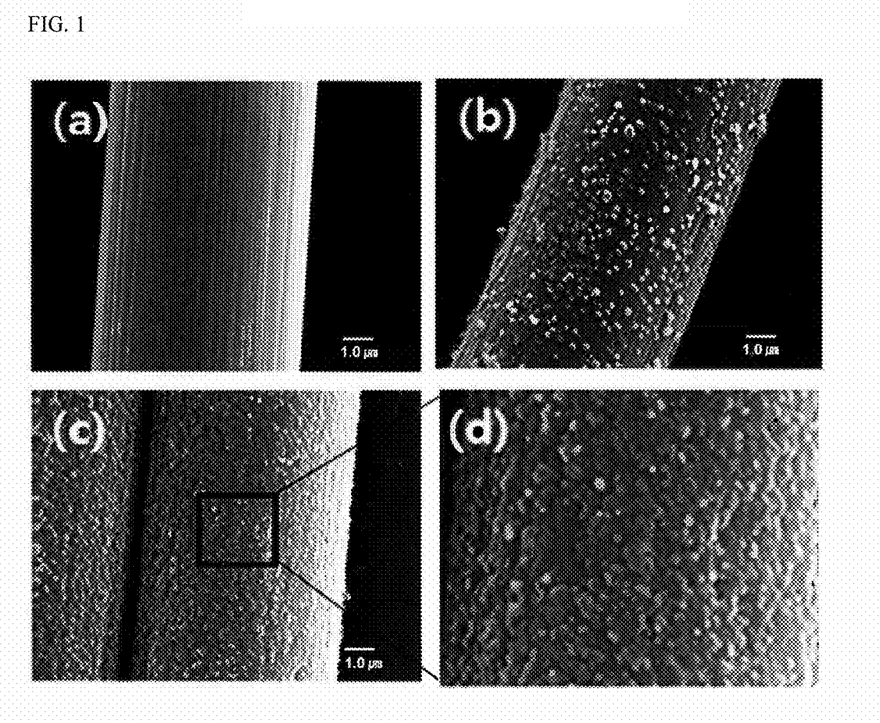
FIG. 1 illustrates a scanning electron microscopic photograph of a carbon fiber composite produced by an exemplary embodiment of the present invention.

FIG. 1 is an SEM observation photograph of the carbon fiber composite produced in Example 1. Specifically, FIG. 1(a) is an SEM photograph illustrating the surface of the carbon fiber from which the sizing agent had been removed, FIG. 1(b) is an SEM observation photograph illustrating that $SiO_2$ particles were attached to the surface of the carbon fiber after being subjected to dip coating and a primary heat treating treatment, FIG. 1(c) is an SEM observation photograph confirming that $SiO_2$ prepared was converted into SiC by a carbothermal reduction, and FIG. 1(d) is an SEM photograph illustrating FIG. 1(c) at a high magnification.

Figure 2:
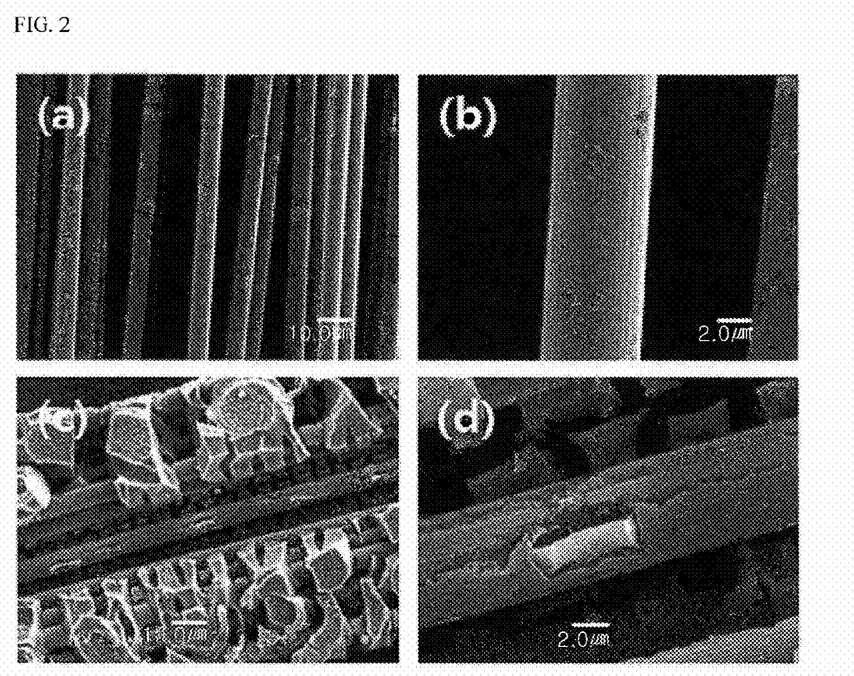
FIG. 2 is a result in which a carbon fiber which is not coated with silicon carbide and a carbon fiber composite produced by Comparative Example 2 are observed by a scanning electron microscope.

FIG. 2 is an SEM observation photograph of the carbon fiber composite produced according to Comparative Example 2. FIG. 2(a) is an SEM photograph illustrating the surface of the carbon fiber from the sizing agent had been removed, and FIG. 2(c) is an SEM observation photograph of the composite produced in Comparative Example 2. FIGS. 1(b) and 1(d) are the SEM photographs obtained by magnifying FIGS. 1(a) and 1(c), respectively.

As illustrated in FIGS. 1 and 2, when a carbon fiber was coated by using a spray method, it can be confirmed that the carbon fiber had been damaged, and that the coating of the composite produced in the Examples was more uniform than that of the composite produced in Comparative Example 2.

Experimental Example 2

XRD Analysis

Figure 3:
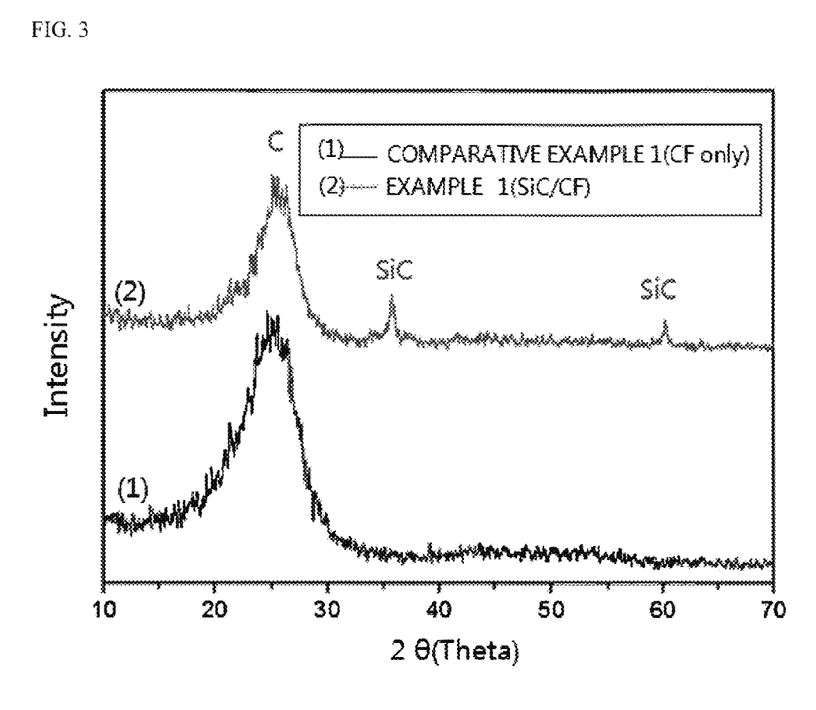
FIG. 3 is a comparison graph showing an XRD analysis result of a carbon fiber which is coated with silicon carbide (Example 1) and a carbon fiber which is not coated with silicon carbide (Comparative Example 1)

In the present invention, FIG. 3 is a result obtained by comparing and analyzing the carbon fiber composite in Example 1 and the carbon fiber in Comparative Example 1 by an X-ray diffractometer (XRD) in order to confirm whether the carbon fiber had been coated with SiC.

As illustrated in FIG. 3, it can be confirmed that silica was converted into SiC by a carbothermal reduction reaction, and attached to the carbon fiber.

Experimental Example 3

Measurement of Thermal Conductivity of Carbon Fiber Composite

A carbon fiber composite was produced in the same manner as in Example 2 and Comparative Example 3, except that the composite was produced by adjusting the ratio of SiC/CF to the content described in the following Table 1, and the thermal conductivity of each carbon fiber composite produced was measured.

The thermal conductivity was measured by a laser flash method using LFA427 (Netzsch). A sample for measuring the thermal conductivity was manufactured in a pellet form with a diameter of 12.6 mm and a thickness of about 1.5 mm, and the thermal conductivity was measured at room temperature by setting the value of the laser voltage to 450 V. Specifically, a thermal conductivity value was calculated by multiplying the thermal diffusivity measured and the specific heat value with the density measured in advance.

For the sample in which the thermal conductivity had been measured, measurement was performed by varying the content of SiC/CF, based on the combined weight of SiCF and the binder, to 0, 5, 10, 20, 40, and 80 wt %, and the result is shown in the following Table 1 and FIG. 4.

TABLE 1

| Content of SiC/CF | Thermal conductivity (W/mK) | |
|---|---|---|
| (wt %) | Comparative Example | Example |
| 0 | 2.17 | 2.17 |
| 5 | 2.16 | 2.66 |
| 10 | 2.05 | 2.36 |

TABLE 1-continued

| Content of SiC/CF | Thermal conductivity (W/mK) | |
|---|---|---|
| (wt %) | Comparative Example | Example |
| 20 | 2.15 | 2.95 |
| 40 | 2.86 | 3.94 |
| 80 | 3.49 | 7.50 |

Figure 4:
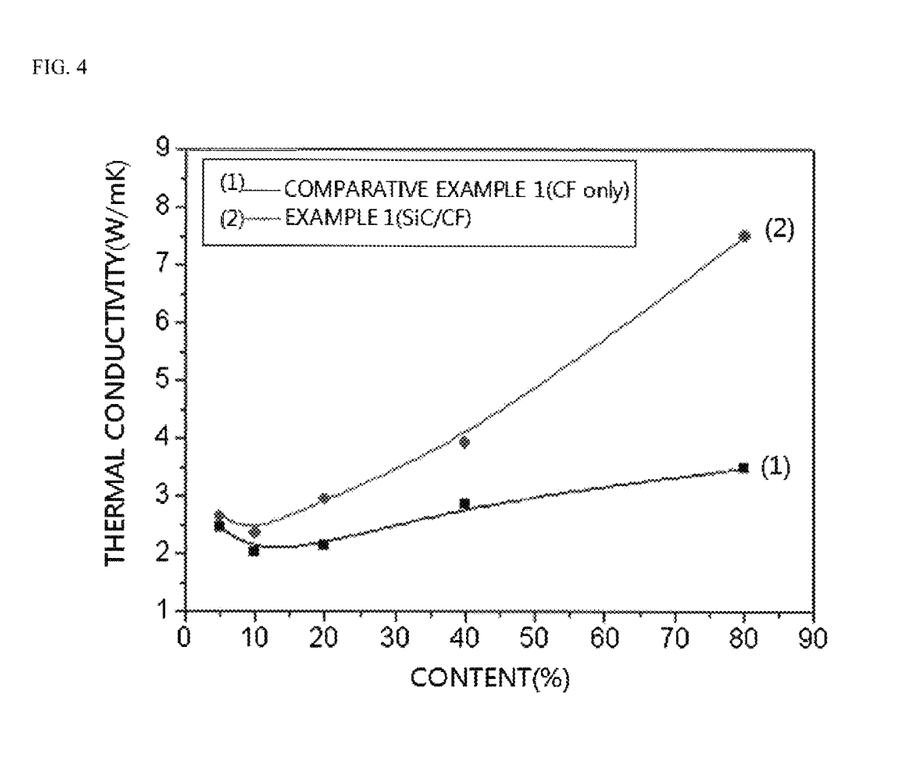
FIG. 4 is a graph showing a result in which the thermal conductivity values of a carbon fiber which is coated with silicon carbide (Example 1) and a carbon fiber which is not coated with silicon carbide (Comparative Example 1) are compared and measured.

As illustrated in Table 1 and FIG. 4, it can be confirmed that the carbon fiber composite produced in the Example of the present invention has excellent thermal conductivity, and that particularly when the content of SiC/CF is 80 wt %, there is two times or more as much difference between the thermal conductivity values of the Example and the Comparative Example.

Experimental Example 4

TGA Analysis of Carbon Fiber Composite

A thermogravimetric analysis (TGA) was performed on each of the carbon fiber composites produced in Example 1 and Comparative Example 1. The TGA was conducted under an air atmosphere at 25° C. to 1,000° C. and a heating rate of 5° C./min. The measurement results are as in FIG. 5.

Figure 5:
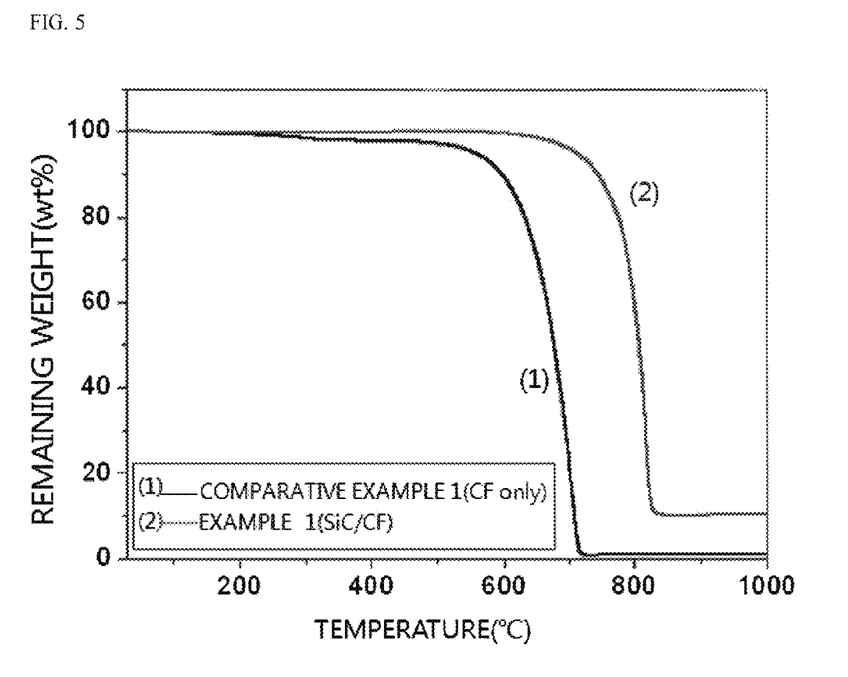
FIG. 5 is a graph showing a thermogravimetric analysis (TGA) result of a carbon fiber which is coated with silicon carbide (Example 1) and a carbon fiber which is not coated with silicon carbide (Comparative Example 1)

Referring to FIG. 5, in the case of Comparative Example 1 in which the carbon fiber was used alone, it can be seen that the carbon fiber had lost most of the weight thereof while being oxidized. On the contrary, it was shown that for the carbon composite (SiC/CF) of Example 1, a weight of about 10 wt % was remaining, and it can be seen that the weight corresponds to a silicon carbide component coated onto the carbon fiber. Furthermore, in the case of Example 1, the oxidation of the carbon fiber occurred at about 750° C. to about 850° C., and the oxidation temperature is higher by about 100° C. than that in Comparative Example 1. Through this, it can be seen that heat resistance of the carbon fiber composite according to the present invention is enhanced.

Further, a TGA was performed on the carbon fiber composite in Example 1, the remaining carbon fiber composite was observed by a scanning electron microscope, and the result is illustrated in FIG. 6. For reference, it was shown that the carbon fiber in Comparative Example 1 had lost most components during the heat treatment process, and thus could not be observed.

Referring to FIG. 6, it can be seen that the carbon fiber was oxidized during the heat treatment process, and coated silicon carbide (SiC) components were remaining on the surface of the carbon fiber. It was confirmed that the remaining silicon carbide covered most of the surface of the carbon fiber, and it can be seen that the coverage of the remaining silicon carbide was about 95 to 99%. In addition, referring to FIG. 6, it can be seen that the coating layer of the remaining silicon carbide had a thickness of about 300 nm.

INDUSTRIAL APPLICABILITY

The carbon fiber composite according to the present invention may be used in various ways in electronic products and the like where heat-dissipating characteristics are required.

What is claimed is:

1. A carbon fiber composite comprising:
   a thermosetting resin binder; and
   40 to 80 parts by weight of carbon fiber coated with silicon carbide, based on 100 total parts by weight of the carbon fiber composite;
   wherein the silicon carbide coating has a thickness of about 100 to 500 nm and is present in an amount of 5 to 30 parts by weight, based on 100 total parts by weight of the carbon fiber coated with silicon carbide; and
   wherein a cured test sample of the carbon fiber composite has a thermal conductivity of 3.8 W/mK or more when measured at 450 V and room temperature.

2. A heat insulating material comprising the carbon fiber composite of claim 1.

3. An electronic product comprising the heat insulating material of claim 2.

4. The carbon fiber composite of claim 1, wherein the silicon carbide coating has a coating coverage of 90% or more, based on the surface area of the carbon fiber.

5. A heat insulating material comprising the carbon fiber composite of claim 4.

6. An electronic product comprising the heat insulating material of claim 5.

7. The carbon fiber composite of claim 1, wherein the thermosetting resin binder comprises one or more of an epoxy resin, a polyurethane resin, a phenol resin, and an alkyd resin.

8. A heat insulating material comprising the carbon fiber composite of claim 7.

9. An electronic product comprising the heat insulating material of claim 8.

10. A method for producing a carbon fiber composite, the method comprising the steps of:
    removing a sizing agent present on a surface of a carbon fiber;
    coating the resulting carbon fiber with a silica sol, allowing silica particles of the sol to attach to the surface of the carbon fiber and to form a carbon fiber coated with silica;
    subjecting the carbon fiber coated with silica to a primary heat treatment at 900° C. to 1,200° C. for 30 minutes to 3 hours, allowing the attached silica particles to aggregate;
    subjecting the heat-treated carbon fiber coated with silica to a secondary heat treatment at 1,300° C. to 1,600° C. for 30 minutes to 3 hours, allowing the aggregated silica particles to convert to silicon carbide and to form a carbon fiber coated with silicon carbide;
    mixing a binder resin with the carbon fiber coated with silicon carbide; and
    performing an ultrasonic wave treatment on the mixture.

* * * * *